United States Patent
Timmermans

[15] 3,653,109
[45] Apr. 4, 1972

[54] METHOD OF PRODUCING COMPOSITE BUSHINGS

[72] Inventor: Frans Donatus Timmermans, 23 Kiel Brunswiker Str. 11a, Kiel, Germany

[22] Filed: Oct. 11, 1968

[21] Appl. No.: 767,589

[52] U.S. Cl. .......................29/149.5, 29/149.5 S, 29/527.6, 29/527.7
[51] Int. Cl. .................................. B21d 53/10, B23p 11/00
[58] Field of Search............29/149.5, 527.6, 527.7, 149.5 D, 29/149.5 Q, 149.5 S, 149.5 C

[56] References Cited

UNITED STATES PATENTS

| | | |
|---|---|---|
| 2,106,590 | 1/1938 | Boegehold et al. ....................29/527.6 |
| 2,289,703 | 7/1942 | Goerke et al. .........................29/149.5 |
| 2,503,533 | 4/1950 | Williams ............................29/149.5 C |
| 2,971,248 | 2/1961 | Kingsley et al......................29/149.5 S |
| 3,500,526 | 3/1970 | Taft .......................................29/149.5 |
| 2,384,654 | 9/1945 | Smith................................29/149.5 R |

Primary Examiner—Thomas H. Eager
Attorney—Erwin Salzer

[57] ABSTRACT

In a process of making bearings of lead bronze a large steel cylinder is lined on the inside thereof with a layer of lead bronze, said layer being produced by centrifugal casting. The steel cylinder and its lining layer are then cut to separate pieces along generatrices of the former and of the latter, and composite bearings are formed of these separate pieces.

9 Claims, 8 Drawing Figures

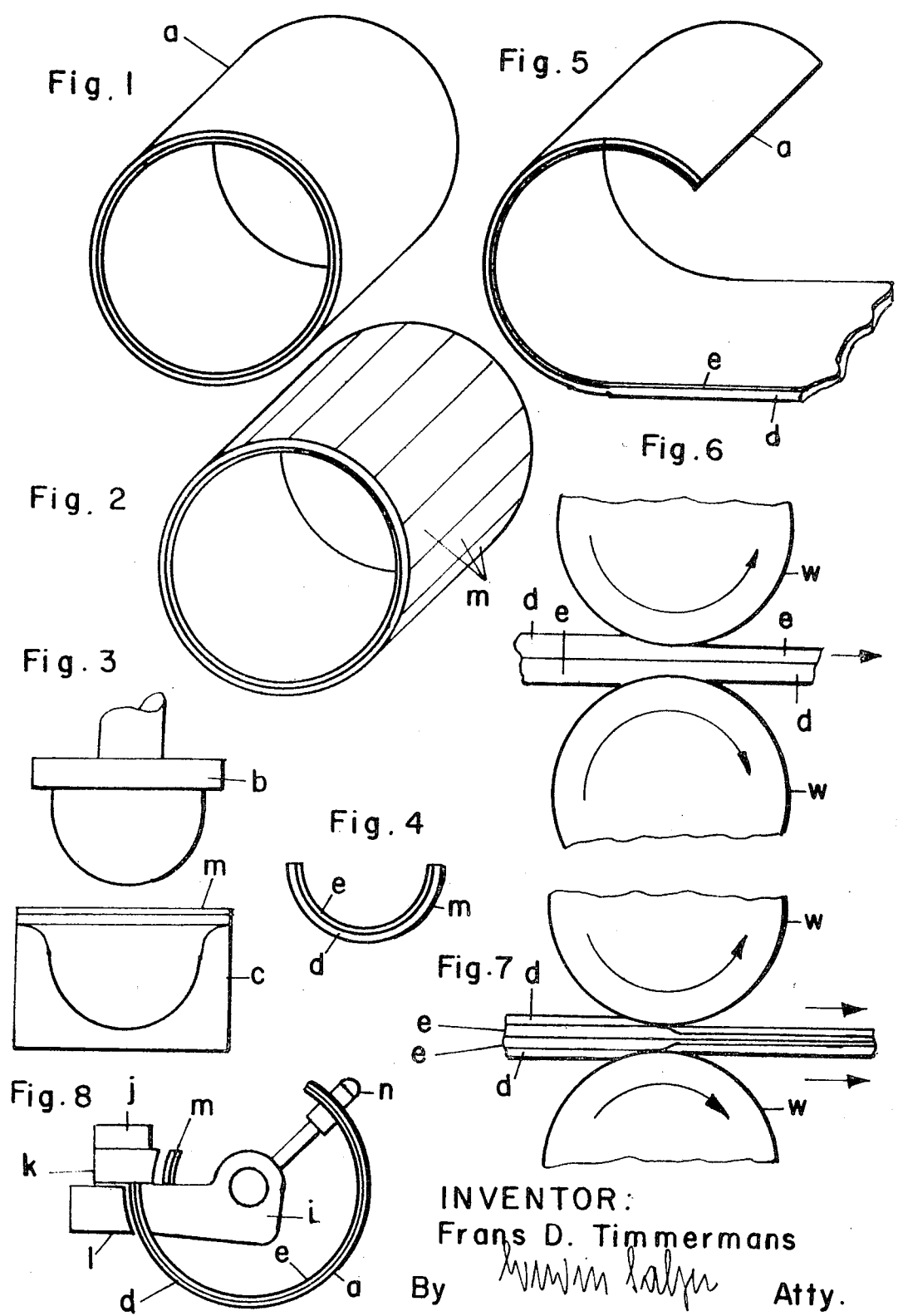

METHOD OF PRODUCING COMPOSITE BUSHINGS

BACKGROUND OF THE INVENTION

As is apparent from the above the present invention relates to a method of making composite bearings of steel and lead bronze, or similar material.

Composite bearings are often made by so-called "strip lining." This method is especially applied if the steel jacket, or backing, of the bearing has only a thin or medium wall thickness of, for example, 1 to 6 mm. This method includes the step of continuously casting a lining of lead bronze upon a steel strip moving forward horizontally at a speed depending upon the downflow of molten lead bronze.

There is another known method of making composite bearings, the so-called "roll" method, a centrifugal method in which tubular sections of steel of a diameter equal to that of the bearings to be made, but several times their width, that is, in lengths of about 200 to 400 mm., are lined by centrifugal action and then divided into individual rings each having the desired width of the bearings.

The strip lining method allows economical mass-production; however, it has a drawback which relates to the bonding of the lead bronze layer to steel, which drawback has not yet been overcome. The "roll" method, on the other hand, is not economical for making thin walled bearings on a large scale.

Another known method of making composite bearings includes the step of centrifugally lining a cylinder or tubular section of sheet steel which has a very large diameter and such a length that it may be divided into a large number of bearing rings, or bearing sections which are subsequently shaped into half shells. The sheet steel cylinder has such dimensions that it retains its shape in spite of high temperatures of about 1,100° C. The wall thickness of the steel cylinder is, therefore, made so large that deformations on account of its thickness are avoided. This, in turn, requires that the steel backing must thereafter be turned down on a lathe. It is quite evident that this method is very uneconomical.

An improvement of this method has been predicated upon neglecting strains and dislocations. This method involves inserting the deformed cylinder into a die which consists of a strong cylinder which is subdivided into a plurality of segments having an outer diameter corresponding to the inner diameter of the deformed cylinder. Furthermore the deformed cylinder may be inserted into another die, working as a counterpart, clamping the deformed cylinder on the whole circumference from the outside. It has been expected that by turning out the inside of the cylinder clamped in such a fashion and then grinding its outside while clamped from the inside, the deformed cylinder, after having undergone this procedure, might show all over an equal thickness of its lead bronze layer as well as of its steel layer. But this is actually not the case.

It is, therefore, an object of the present invention to provide a new method of making composite bearings which method constitutes an important improvement of the centrifugal casting method previously described, inasmuch as the bonding of the lining metal to the steel backing effected by the centrifugal action is more effective than can be achieved by means of the prior art stripping method. Furthermore, the novel method achieves an even thickness of the lining as well as of the steel backing and is not less economical than the well-known stripping method, and much superior to the prior art centrifugal casting methods. The method according to the present invention is related to the prior art centrifugal method inasmuch as it also utilizes a steel cylinder lined by centrifugal action with lead bronze. The steel cylinder has a length, or height, and a circumference, or diameter, which are many times of those of the bearings made. Such a steel cylinder is lined by centrifugal action on the inside with a layer of lead bronze, or similar material. The subsequent steps of the method according to this invention are different from any prior art method. This will become more apparent from the following description and from the accompanying drawings.

SUMMARY OF THE INVENTION

The process according to this invention includes the step of lining a steel cylinder whose diameter is larger than the diameter of the bearings to be made on the inner surface thereof with a lining of lead bronze by means of centrifugal action, or centrifugal casting. Thereupon the cylinder is subdivided along the generatrices thereof into a plurality of workpieces which are first flattened and then pressed into shape to form bearing shells. There are two principal ways of achieving this end. Either the cylinder may be cut open along one single generatrix thereof and thereafter converted into, or rolled to form, a flat plate. The latter is subsequently cut into strips from which bearings are formed. As an alternative, the cylinder may be cut initially into a plurality of sections along a plurality of generatrices thereof, which sections are then formed into bearings.

BRIEF DESCRIPTION OF THE DRAWINGS

FIG. 1 is an isometric view of a steel cylinder having an internal lining of lead bronze;

FIG. 2 is an isometric view of the same cylinder as shown in FIG. 1 and FIG. 2 indicates a plurality of generatrices along which the cylinder is to be subdivided to form a plurality of workpieces in the form of strips;

FIG. 3 is a diagrammatic side elevation of a bending device, or die, for bending strips resulting from subdividing the cylinder of FIGS. 1 and 2 along generatrices thereof in a direction transversely to their initial curvature;

FIG. 4 is a side elevation of a strip resulting from subdivision of the cylinder of FIGS. 1 and 2 and subsequent bending of the strip in the bending device of FIG. 3 to form a bearing half-shell;

FIG. 5 is an isometric view of the same cylinder as shown in FIG. 1 upon being cut open along a generatrix thereof and in the process of being unrolled into a plane;

FIG. 6 is a diagrammatic side elevation of a roller press for flattening the cylinder sections resulting from the subdivision of a cylindrical surface such as shown in FIGS. 1 and 2;

FIG. 7 is a diagrammatic side elevation of a rolling device for processing workpieces formed by subdividing a cylinder such as that shown in FIGS. 1 and 2; and FIG. 8 is a top plan view of a cutting device for severing a cylindrical surface along generatrices thereof as indicated in FIG. 2.

DESCRIPTION OF PREFERRED EMBODIMENTS

FIG. 1 shows an end view of a lead-bronze-lined steel cylinder $a$. The thickness of its lead-bronze-lined steel sheet exceeds that of the finished bearing with a necessary minimum after cleaning as usual by means of the pickling bath. Corrosion during the lining process can be avoided by adding graphite to the lead bronze chips, or molten material and by using a protective gas such as hydrogen, or nitrogen, or the like. The lead-bronze-lined cylinder may now be cut into strips in axial direction having substantially the width of the bearings (plus a small excess).

FIG. 2 shows the mode of dissecting the cylinder of FIG. 1 into strips $m$ which process may be carried out by means of a machine such as that shown in FIG. 8 in an end view. Referring now to FIG. 8, $a$ is the lead-bronze-lined cylinder inserted into, and carried by, a clamp mechanism $n$ pivoted at a center. Part $i$ forms a guide for cylinder $a$. Between $i$ and $l$ an adjustable slit is formed which receives the wall of the cylinder $a$. The clamp mechanism $n$ supporting cylinder $a$ moves the left edge of the cylinder wall into the slit formed between parts $i$ and $l$ until it engages stop or dog $l$. Then the wall of the cylinder $a$ is stopped by the stop or dog $j$ and is ready to be cut off by means of the chisel $k$. The chisel $k$ cuts off rapidly one strip $m$ after another, i.e., at a high repetition rate. Strips $m$ have a width corresponding to that of the prospective bearing. The strips $m$ are cut into shorter pieces, and these pieces have a length corresponding to the circumference of a bearing half shell. The steel backing and the inner lining of lead bronze of these strips have a uniform wall thickness at all points. Then these sections of strips $m$ still having a curvature in longitudinal direction, may be pressed crosswise to the longitudinal curvature to form bearing half shells with an inside lead-bronze-lining as shown in FIG. 4.

According to FIG. 3 the die $b$ presses each strip-section $m$ crosswise to its longitudinal sinuous cavity from the lead-bronze-side into the hollow form $c$. This process involves a pressing action in two directions, i.e., flattening of strip $m$ in one direction and curving of the strip $m$ to the bearing half shell in a crosswise direction. This is achieved while pressing the strip $m$ into the proper matrix $c$.

FIG. 4 shows a bearing half shell formed in that way in an end view. By this rather unorthodox way of crosswise pressing all deformations and tensions produced as a result of the centrifugal lining process of the cylinder disappear entirely, and the shell gains increased hardness. This kind of dual bending is one of the essential features of the present invention. One may subdivide the process of exerting pressure crosswise upon the strips resulting from sub division of the lined cylinder into two steps. The first step includes rolling out longitudinal strips to remove their initial cylindrical curvature and the second step includes rolling of flattened strips in crosswise direction. In order to do so one may cut the cylinder longitudinally into two portions one of which is the welding seam and the other the rest of the cylinder. The cylindrical surface thus opened is flattened by re-rolling. Thus its wall forms, in effect a substitute for a flat piece of steel strip lined with lead bronze as produced by prior art methods. The re-rolling process will, in general, flatten the cylinder wall only to a limited extent, i.e., there will not be significant elongation of the cylinder wall exceeding the order of 5 percent. This is enough to do away with any deformation and strain by cold steel-flow. The step of rolling of the lead-bronze-lining, coupled with the flattening of the concave surface, is quite unorthodox because of the prevalent erroneous belief that by rolling the concave surface of the lead-bronze-lining the latter would break up, i.e., become incapable of forming a bearing surface. It is another part of the present invention to have overcome this erroneous concept.

FIG. 5 shows the open cylinder $a$ with its steel backing $d$ and the lead-bronze-lining $e$ viewed during the re-rolling process. THe flattened lined steel strip may be rolled between two rollers as shown in FIG. 6 to various degrees of elongation not exceeding 5 to 10 percent of the length of the flattened cylinder wall $a$ with the steel backing $d$ and the lining $e$. FIG. 6 shows how layers $d$ and $e$ are rolled between the two rolls $w$ and $w$.

FIG. 7 also shows a rolling process of flattened lead-bronze-lined steel cylinders. Two pieces to be rolled jointly are inserted between the pair of rolls $w$. The pieces each including backing $d$ and lining $e$ are put together with their lining surfaces, the latter being separated by graphite or the like intermediate layers preventing the pieces to fuse together.

If it is intended to roll down heavy cylinder sections, cold rolling is no longer practicable. It is then necessary to resort to hot-rolling when rolling down the lead-bronze-lined steel plates. The temperature at which this hot-rolling process must be performed depends upon the contents of lead in the lead bronze, i.e., the proportion of lead to copper. This may be, for instance, 15 percent or 20 percent. The rollability of lead-bronze-lined steel decreases as the contents of lead in he lead bronze increases. A relatively thick lead-bronze-lined steel plate calls for red-heat temperatures for its rolling process. At such temperatures the lead phase in the lead bronze melts but is not significantly squeezed out of the sandwich, even in the presence of heavy rolling pressures.

Instead of feeding two superimposed lead-bronze-lined plates to the nip formed between rollers $w$ as shown in FIG. 7, a non-lined heavy steel plate may be substituted for one of the lead-bronze-lined plates. Such a heavy steel plate should be much heavier than the lead-bronze-lined steel plate, exceed the length and the width of the latter and used in cold condition.

As mentioned above, an appropriate separator ought to be inserted between pairs of plates which are being jointly rolled. The hot-rolled lead-bronze-lined plate may be subsequently re-rolled in cold condition in order to harden the steel backing thereof.

Another aspect of the invention relates to the cooling of the workpieces and the heating thereof. The preferred method of heating the rotating cylinder to line the same with lead bronze is induction heating. The heating temperature may be in the order of 1,100° C. The inductive heater includes a spool or winding having but a few turns. This spool or winding may be of copper and have fine perforations or holes allowing the outflow of a cooling medium, such as water, upon the white-hot (1,100° C.) rotating steel cylinder. The evolving steam results in delayed cooling of the rotating steel cylinder. The still rotating cylinder and the induction coil may be separated from each other and the former may be dipped in part into molten lead, or into an alloy, having a still lower melting point. This causes rapid cooling of the cylinder. Water may be used to achieve an additional cooling action. The rate of cooling controls the time when solidification occurs, precluding separation of the constituents of the lead-bronze.

The induction coil having few turns used for induction heating of the steel cylinder to be lined with lead bronze may be cylindrical and include two semi-cylindrical sections which are pivotally interconnected by hinge means including a shaft or pin of insulating material. The insulating material must by heat resistant or have a high melting point. The plastic material known by its trademark TEFLON may be used for making the hinge pins. The electric contact or current-carrying connection between the two semi-cylindrical sections of the induction heating coil may be established by the aforementioned hinge means for pivotally attaching one of the sections to the other. In the system under consideration the induction coil for heating the steel cylinder to be lined and the steel cylinder to be lined are arranged in coaxial relation, their common axis being horizontal. After inductive heating of the steel cylinder in the process of being lined with lead-bronze up to about 1,100° C., the induction coil is opened, i.e., its semi-clyindrical sections pivoted apart, and moved upward. A container with molten lead or alloy is likewise moved upward, or elevated. As a result, the latter container surrounds the white-hot rotating steel cylinder and the molten lead filling of the aforementioned container touches the steel cylinder whose rotary motion is maintained. During this dipping process, which is in effect a controlled cooling process—the cooling medium being liquid lead or the like—the aforementioned container is covered so that no liquid lead can be thrown out of it. Upon completion of this cooling process the steel cylinder is moved back to its first or initial position. Thereupon the split induction heater coil which has been previously opened is reclosed, re-establishing a current path and a water channel through the constituent turns thereof. NOw the induction heater is ready for pouring water upon the steel cylinder still in rotation.

The steel cylinder may have any desired diameter and any desired width. It is desirable to increase its diameter close to practical limits. Such an increase of diameter imposes restrictions in regard to the width of the steel cylinder, i.e., its width must then be kept relatively small in order to preclude a deformation or distortion of the steel cylinder by centrifugal action. The diameter of the steel cylinder may, for instance, be 120 cm. and the width of the cylinder wall 20 cm. or 25 cm. Such dimensions will result in a strip of lead-bronze-lined steel having a length of about 4 m. after rerolling. Such a strip is then cut in a direction longitudinally thereof into two parts which are then used to form bearing half shells as shown in FIG. 4.

It is desirable to completely automate the production of lead-bronze-lined steel cylinders in accordance with a strict program. The timing of such an automated production set-up may be controlled by thermal sensing means, e.g., a pyrometer or spectrometer.

Summarizing the above, it will be apparent that the present method of making composite bearings includes the step of lining a steel cylinder with lead bronze by centrifugal action. This steel cylinder has relatively large dimensions as compared to the dimensions of the individual bearings intended to be made, i.e., the diameter and also the length of this steel cylinder exceeds the diameter and the length of the individual bearings intended to be made. The wall thickness of the steel cylinder exceeds slightly the thickness of a backing layer of steel of the individual bearings intended to be made. The lead-bronze-lined steel cylinder is cut open in axial direction and more or less flattened, or bent open by a rolling operation. The resulting lead-bronze-lined steel plate is cut along lines forming generatrices of the original steel cylinder into a plurality of strips. These strips are bent transversely to the original curvature of the lead-bronze-lined steel cylinder to form the half shells of 180° shown in FIG. 4.

An important feature of this invention is flattening the strips resulting from sectionalizing the surface of the lead-bronze-lined steel cylinder in a direction longitudinally of said strips and of bending these strips transversely to form half cylindrical shells and to perform the flattening and transverse bending operation by one single stroke of a pressure exerting die, as also shown in FIG. 4.

Another important feature of this invention is the removal of deformations and strains caused by the centrifugal lining process in the walls of the steel cylinder by subjecting the walls to a rolling process following slicing of the steel cylinder to increase the length thereof up to 10 percent of its original length.

Hot-rolling is indicated and may be combined with cold-rolling wherever relatively heavy workpieces are involved.

An important step involved in the centrifugal casting or steel-cylinder lining process consists in continuously filling the closed steel cylinder with a suitable gas such as, for instance, nitrogen to protect the melted lead bronze inside of the steel cylinder. The melted lead bronze may also be protected against oxidation by a mixture containing graphite and a nitrogen compound evolving nitrogen at the high temperatures—about 1,100° C.—involved in the centrifugal casting process.

Still another important aspect of the invention is the dual strip rolling process illustrated in FIG. 7. In that modification of the invention a pair of cut open lined steel cylinders is jointly rolled down at elevated temperatures of about 500° C., or when red-hot. Both lined flattened cylinder walls are superimposed with their lead-bronze-linings in juxtaposition. The juxtaposed lead-bronze-linings are separated by a sheet material during their joint and simultaneous rolling down process to preclude fusing together of the lead-bronze-linings thereof.

Having thus fully disclosed my invention, what I claim is:

1. A method of making composite bearings including the steps of lining a steel cylinder having relatively large dimensions as compared to the dimensions of the individual bearings to be made and having a length and a diameter far exceeding the length having a wall thickness but slightly exceeding the wall thickness of a steel backing layer of said individual bearings with lead bronze by means of a centrifugal casting process, thereafter cutting said lead bronze lined steel cylinder in axial direction thereafter flattening said lead bronze lined steel cylinder and bending it open by a rolling operation, then cutting the flattened lead bronze lined- steel plate thus obtained along generatrices of said steel cylinder into a plurality of flat strips, and bending said plurality of flat strips transversely to the original curvature of said steel cylinder to form half shells of 180°.

2. A method of making composite bearings of steel and lead bronze including the steps of lining a steel cylinder having relatively large dimensions in comparison to the dimensions of the individual bearings to be made and having a length and a diameter far exceeding the length and diameter of said individual bearings and having a wall thickness exceeding the wall thickness of a steel backing layer of said individual bearings only to a small extent with lead bronze by means of a centrifugal casting process, then cutting the lined cylinder in axial direction into strips having a length equal to the height of said cylinder and a width equal to the width of said bearings when finished, then cutting said strips to shorter length substantially equal to half the circumference of the bearings to be made, then applying pressure to the shortened slightly curved strips to flatten said strips in a direction longitudinally thereof and bending said strips transversely to form half cylindrical shells, said flattening of each of said strips and said transverse bending of each of said strips being performed by one single stroke of a pressure exerting die.

3. A method of making a material for composite bearings of steel and lead bronze or similar material including the steps of lining a steel cylinder having relative large dimensions in comparison to the dimensions of individual bearings to be made by means of a centrifugal casting process, thereafter cutting open the lined cylinder in an axial direction and flattening the cylinder wall by slight rolling to result in an increase in the length thereof up to 10 percent of the original length of said cylinder, whereby deformations and strains caused by said centrifugal casting process in the walls of said steel cylinder are removed.

4. A method as specified in claim 3 wherein the diameter of the lined steel cylinder is in the order or in excess of 1 meter.

5. A method as specified in claim 3 including the step of protecting the molten lead bronze in the steel cylinder during the centrifugal casting process by continuously filling the closed steel cylinder with a protective gas.

6. A method as specified in claim 5 including the step of protecting the molten lead bronze against oxidation by addition of a mixture containing graphite and a nitrogen compound evolving nitrogen at the high temperatures involved in said centrifugal casting process.

7. A method as specified in claim 3 including repeated rolling of said cut opened lined cylinder for strengthening the same and to increase the lengthening effect of the initial rolling step.

8. A method as specified in claim 3 including the steps of jointly rolling down a pair of said cut open lined flattened steel cylinders at elevated temperatures, of superimposing said pair of lined flattened steel cylinders with the linings thereof in juxtaposition while in the process of being jointly rolled down, and separating said linings by a sheet material interposed between said linings during the rolling down process of said flattened steel cylinders at elevated temperatures.

9. A process as specified in claim 3 including the step of subjecting the flattened cylinder walls to a joint rolling action and heat treatment at red hot temperatures of about 500° C.

* * * * *